United States Patent
Robinson et al.

(10) Patent No.: US 10,380,815 B2
(45) Date of Patent: Aug. 13, 2019

(54) TRANSIENT ASSET MANAGEMENT SYSTEMS AND METHODS

(71) Applicant: Schweitzer Engineering Laboratories, Inc., Pullman, WA (US)

(72) Inventors: Kylan T. Robinson, Colton, WA (US); Rhett Smith, Kuna, ID (US); George W. Masters, Moscow, ID (US); Ryan Bradetich, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 128 days.

(21) Appl. No.: 15/491,508

(22) Filed: Apr. 19, 2017

(65) Prior Publication Data

US 2017/0221287 A1 Aug. 3, 2017

Related U.S. Application Data

(63) Continuation of application No. 14/823,189, filed on Aug. 11, 2015, now Pat. No. 9,773,363.

(51) Int. Cl.
*G07C 9/00* (2006.01)
*H04L 29/06* (2006.01)

(52) U.S. Cl.
CPC ....... *G07C 9/00134* (2013.01); *G07C 9/0069* (2013.01); *G07C 9/00174* (2013.01); *G07C 9/00571* (2013.01); *H04L 63/083* (2013.01); *H04L 63/0853* (2013.01); *H04L 63/102* (2013.01); *H04L 63/107* (2013.01); *G07C 9/00896* (2013.01); *G07C 2209/04* (2013.01)

(58) Field of Classification Search
None
See application file for complete search history.

(56) References Cited

U.S. PATENT DOCUMENTS

| | | | |
|---|---|---|---|
| 6,738,628 B1 | 5/2004 | McCall et al. |
| 7,012,503 B2 | 3/2006 | Nielsen |
| 7,205,882 B2 | 4/2007 | Libin |
| 7,323,991 B1 | 1/2008 | Eckert |

(Continued)

FOREIGN PATENT DOCUMENTS

| | | |
|---|---|---|
| WO | 2010067205 | 6/2010 |
| WO | 2014029774 | 2/2014 |

OTHER PUBLICATIONS

PCT/US2015/038622 Patent Cooperation Treaty, International Search Report and Written Opinion of the International Searching Authority, dated Sep. 30, 2015.

(Continued)

*Primary Examiner* — Daniell L Negron
(74) *Attorney, Agent, or Firm* — John P. Davis; Richard M. Edge

(57) ABSTRACT

Systems and methods are disclosed that provide for managing transient assets used in connection with an access-controlled area of a distribution site of an electric power delivery system. In some embodiments, one or more users entering and access-controlled area may be identified via physical access control credentials provided to an associated access control system. Transient assets brought within an access-controlled area may be detected via one or more wired and/or wireless communication channels and may be associated with the one or more identified users located within the access-controlled area.

6 Claims, 5 Drawing Sheets

(56) References Cited

U.S. PATENT DOCUMENTS

| | | |
|---|---|---|
| 7,353,396 B2 | 4/2008 | Micali |
| 7,616,091 B2 | 11/2009 | Libin |
| 7,848,905 B2 | 12/2010 | Troxler |
| 8,108,914 B2 | 1/2012 | Hernoud |
| 8,407,775 B2 | 3/2013 | Conlin |
| 8,446,249 B2 | 5/2013 | Gerstenkorn |
| 8,482,378 B2 | 7/2013 | Sadighi |
| 8,494,576 B1 | 7/2013 | Bye |
| 8,994,498 B2 | 3/2015 | Agrafioti |
| 2008/0173709 A1 | 7/2008 | Ghosh |
| 2010/0201230 A1 | 8/2010 | Schweitzer |
| 2012/0208549 A1 | 8/2012 | Lau |
| 2012/0280790 A1 | 11/2012 | Gerhardt |
| 2013/0237193 A1 | 9/2013 | Dumas |
| 2013/0257589 A1 | 10/2013 | Mohiuddin |
| 2014/0121858 A1 | 5/2014 | Chen |
| 2014/0150502 A1 | 6/2014 | Duncan |
| 2014/0266585 A1* | 9/2014 | Chao ................. G07C 9/00111 340/5.61 |
| 2015/0221152 A1 | 8/2015 | Andersen |
| 2016/0234024 A1* | 8/2016 | Mozer ................. H04L 9/3231 |

OTHER PUBLICATIONS

Robinson et al. "RFID Smart Home: Access Control and Automated-Lighting System", Oct. 23, 2008, pp. iii and 4-17.

* cited by examiner

TRANSIENT ASSET MANAGEMENT SYSTEMS AND METHODS

RELATED APPLICATION

The present application is a continuation application of U.S. patent application Ser. No. 14/823,189, filed on 11 Aug. 2015, titled "Transient Asset Management Systems and Methods", naming Kylan T. Robinson, Rhett Smith, George W. Masters, and Ryan Bradetich as inventors, which is incorporated herein by reference in its entirety.

FEDERALLY SPONSORED RESEARCH OR DEVELOPMENT

This invention was made with U.S. Government support under Contract No.: DOE-OE0000680. The U.S. Government may have certain rights in this invention.

TECHNICAL FIELD

This disclosure relates to systems and methods for managing transient assets and, more particularly, to systems and methods for managing transient assets used in connection with an access-controlled area of a distribution site of an electric power delivery system.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
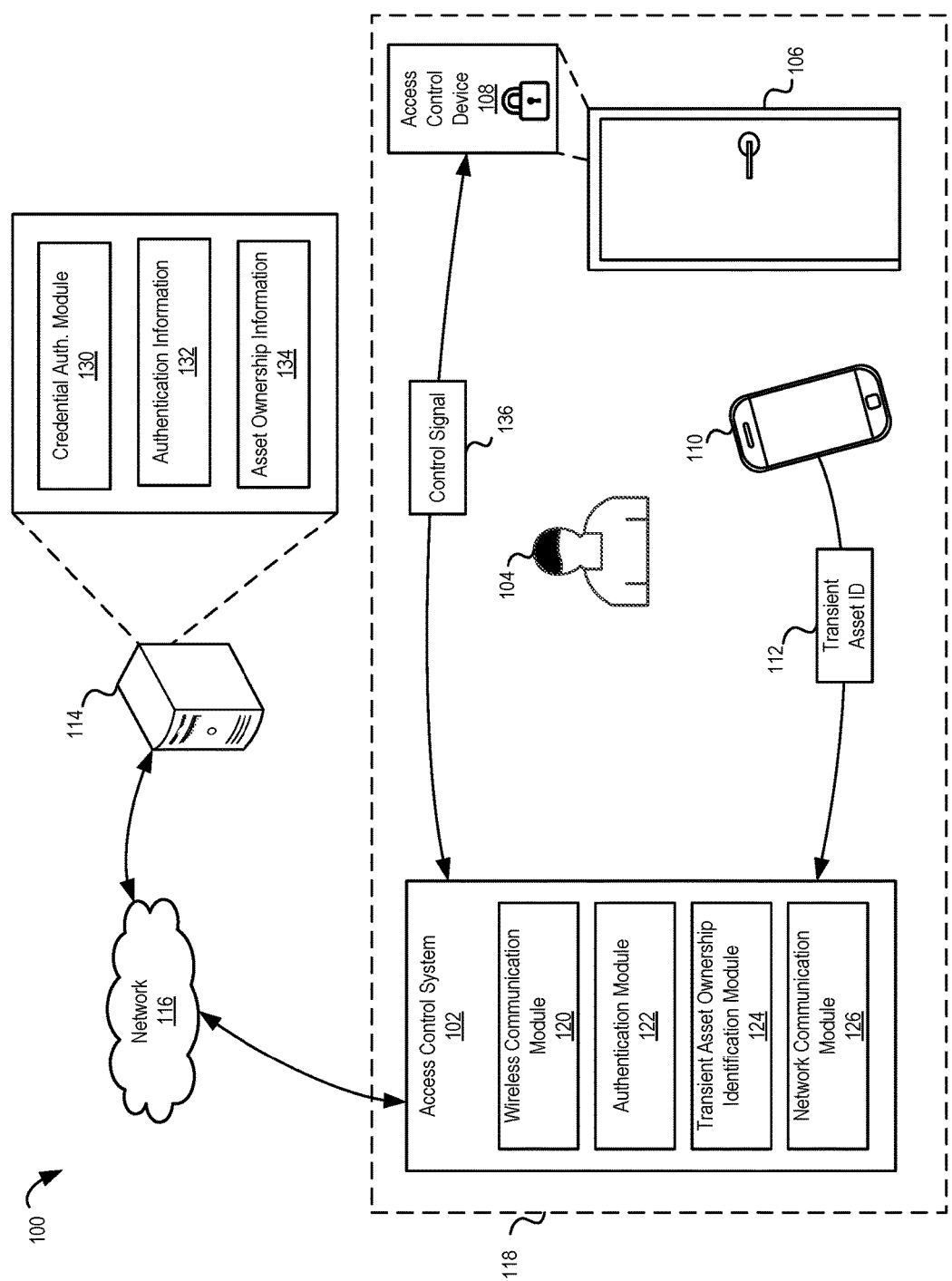
FIG. 1 illustrates an exemplary transient asset management architecture and association of a transient asset with a user consistent with embodiments disclosed herein.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Electrical power generation and delivery systems are designed to generate, transmit, and distribute electrical energy to loads. Electrical power generation and delivery systems may include a variety of equipment, such as electrical generators, electrical motors, power transformers, power transmission and distribution lines, circuit breakers, switches, buses, transmission and/or feeder lines, voltage regulators, capacitor banks, and/or the like. Such equipment may be monitored, controlled, automated, and/or protected using intelligent electronic devices ("IEDs") that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers ("PLCs"), programmable automation controllers, input and output modules, governors, exciters, statcom controllers, access control systems, SVC controllers, OLTC controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

Certain equipment associated with an electrical power generation and delivery system may be distributed in one or more sites and/or locations. For example, a variety of equipment (e.g., IEDs, network equipment, and/or the like) may be associated with a distribution substation location of an electric power delivery system. In some circumstances, distributed sites of an electrical power generation and delivery system may be located in relatively remote and/or infrequently accessed locations. For example, certain distributed sites may be accessed infrequently by individuals performing maintenance, diagnostic, and/or repair activities on equipment associated with the sites (e.g., utility and/or other service personnel).

To ensure the physical security of a distributed site and/or associated equipment, a distributed site may include one or more access control devices including, for example, locks (e.g., electromagnetic, mechanical, and/or solenoid locks), tamper protection devices, security-hardened buildings, enclosures, and/or utility boxes, alarm systems, and/or the like. A physical access control system in communication with the one or more access control devices may be configured to allow personnel wishing to access the distributed site to authenticate their identity and/or their rights to physically access the distributed site and/or associated equipment. Based on a successful authentication, the access control system may issue one or more control signals to associated physical access control devices configured to allow the personnel physical access to the distributed site and/or associated equipment (e.g., by issuing a control signal configured to disengage a solenoid lock, an alarm system, and/or the like). In some embodiments, the physical access control system and/or associated devices may establish a secure access-controlled boundary associated with the distributed site.

A variety of physical and electronic security requirements may be associated with a distributed site. For example, the distributed site may require two factor authentication for physical access to the site. Electronic security requirements may require tracking and/or identification of transient assets (e.g., transient electronic devices and/or the like) brought within a secure access-controlled boundary and/or area of the distributed site. Such requirements may, among other things, allow a utility to track the location of its transient assets, to identify instances when unknown and/or unapproved transient devices may be brought within access-controlled areas, and/or to associate unknown transient assets and/or devices with individuals allowed physical access to a distributed site.

Consistent with embodiments of the systems and methods disclosed herein, transient assets brought within a secure access-controlled area of a distributed site may be associated with one or more users located within the access-controlled area. In certain embodiments, the one or more users located within the access-controlled area may be identified using physical access control information associated with an access control system managing physical access to the distributed site. Transient assets brought within an access-controlled area may be detected (e.g., by the access control system and/or a transient asset management system communicatively coupled therewith) via one or more wired and/or wireless communication channels and may be associated with one or more identified users located within the access-controlled area.

Several aspects of the embodiments described herein are illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may reside in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit ("ASIC"), PAL, PLA, PLD, field programmable gate array ("FPGA"), or any other customizable or programmable device.

FIG. 1 illustrates an exemplary transient asset management architecture 100 consistent with embodiments disclosed herein. In certain embodiments, an access control system 102 may be associated with a distributed site 118 of an electric power generation and delivery system. Consistent with embodiments disclosed herein, the access control system 102 may be configured to provide physical access control to the distributed site 118 and/or transient asset management within the distributed site 118. Although illustrated in connection with a distributed site 118 of an electric power generation and delivery system, it will be appreciated that embodiments of the disclosed systems and methods may be utilized in connection with managing transient assets in a variety of physical access-controlled areas. In addition, although illustrated in connection with a distributed site 118, it will be appreciated that the disclosed embodiments may be utilized in connection with any access-controlled boundary.

The distributed site 118 may include a variety of equipment (not shown) associated with the electric power generation and delivery system including, without limitation, one or more IEDs, network communication equipment, electrical generators, electrical motors, power transformers, power transmission and distribution lines, circuit breakers, switches, buses, transmission and/or feeder lines, voltage regulators, capacitor banks, and/or the like. In certain embodiments, the distributed site 118 may comprise a subset of equipment associated with a distributed location of an electric power generation and/or delivery system (e.g., a portion of a distribution substation). For example, in some embodiments, the distributed site 118 may comprise a distribution substation of an electric power delivery system. In further embodiments, the distributed site 118 may comprise a panel and/or utility box housing equipment associated with an electrical generation and/or delivery system.

Physical access to the distributed site 118 and/or equipment associated with the same may be facilitated via one or more access points 106. As illustrated, the access point 106 may comprise a door to a building associated with the distributed site 118. In further embodiments, the access point 106 may include one or more panels and/or boxes facilitating access to equipment housed therein. In yet further embodiments, the access point 106 may be associated with a particular piece of equipment (e.g., an IED or the like) within the distributed site 118. For example, the access point 106 may comprise an access panel to a particular piece of equipment within the distributed site 118.

Physical access by a user 104 using the one or more access points 106 may be managed by one or more access control devices 108 associated with an access point 106. In certain embodiments, an access control device 108 may be controlled by the access control system 102 associated with the distributed site 118. The access control devices 108 may comprise one or more locks (e.g., electromagnetic, mechanical, and/or solenoid locks), alarm systems, and/or the like. For example, in certain embodiments, an access control device 108 may comprise an electronically actuated lock for a door.

Consistent with embodiments disclosed herein, a user 104 may communicate with the access control system 102 via one or more interfaces (e.g., keypads, buttons, biometric scanners, badge scanners, and/or the like) to authenticate physical access to the distributed site 118. For example, a user 104 may provide the access control system 102 with authentication credentials such as a personal identification number ("PIN") or the like via a keypad interface. Using the authentication credentials, the access control system 102 and/or a remote authentication service 114 in communication with the access control system 102 may authenticate whether the user 104 providing the authentication credentials has rights to physically access the distributed site 118.

The access control system 102, the authentication service 114 and/or other associated systems (e.g., transient asset 110) may comprise any suitable computing system or combination of systems configured to implement embodiments of the systems and methods disclosed herein. In certain embodiments, the access control system 102, the authentication service 114 and/or other associated systems may comprise at least one processor system configured to execute instructions stored on an associated non-transitory computer-readable storage medium. In some embodiments, the access control system 102, the authentication service 114 and/or other associated systems may further comprise secure execution space configured to perform sensitive operations such as authentication credential validation and/or other aspects of the systems and methods disclosed herein. The access control system 102, the authentication service 114 and/or other associated systems may further comprise software and/or hardware configured to enable electronic communication of information between the systems 102, 114 via one or more associated network connections (e.g., network 116).

The access control system 102, the authentication service 114 and/or other associated systems may comprise a computing device executing one or more applications configured to implement embodiments of the systems and methods disclosed herein. In certain embodiments, the control system 102, the authentication service 114 and/or other associated systems may comprise a laptop computer system, a desktop computer system, an IED, a server computer system and/or any other computing system and/or device that may be utilized in connection with the disclosed systems and methods.

The various systems 102, 110, 114 may communicate via one or more networks comprising any suitable number of networks and/or network connections. For example, as illustrated, the access control system 102 may communicate with the authentication service 114 via network 116. The network connections may comprise a variety of network communication devices and/or channels and may utilize any suitable communication protocols and/or standards facilitating communication between the connected devices and systems. The network connections may comprise the Internet, a local area network, a virtual private network, and/or any other communication network utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards (e.g., Wi-Fi®), Bluetooth®, ultra-wide band ("UWB"), Zigbee®, and/or any other suitable communication protocol(s).

Using an interface associated with the access control system 102, a user 104 may enter authentication credentials for authenticating their rights to physically access the distributed site 118. In certain embodiments, the interface may comprise a touchscreen, a keyboard, a mouse, a track pad, and/or any other suitable interface associated with the access control system 102. For example, the interface may comprise a physical key and/or electronic 10-digit key pad (e.g., a keypad displayed on a touchscreen interface). The authentication credentials may comprise any type of numeric (e.g., a PIN), alphanumeric, symbolic, and/or other type of authentication credentials. In further embodiments, the authentication credentials may comprise a biometric sensor input, information received from a security key or card in communication with the interface (e.g., using a near field communication ("NFC") standard), and/or the like. It will be appreciated that a variety of types of authentication credentials and associated interfaces may be used in connection with the disclosed embodiments.

After receiving the authentication credentials from the user 104, the access control system 102 may authenticate the validity of the authentication credentials using a credential authentication module 122 executing thereon. The credential authentication module 122 may comprise software and/or hardware configured to authenticate the validity of the authentication credentials provided to the access control system 102 and issue one or more responses and/or control signals 136 in connection with the same. For example, in certain embodiments, the credential authentication module 122 may compare a PIN included in the authentication credentials with known PINs associated with personnel having current access rights to the distributed site 118. If the PIN included in the authentication credentials is a known PIN associated with personnel having current access rights to the distributed site 118, the access control system 102 may issue a control signal 136 to an access control device 108 associated with an access point 106 of the distributed site 118. For example, in certain embodiments, the control signal 136 may actuate a lock associated with the access point 106, may disable an alarm system associated with the access point 106, and/or the like. In further embodiments, a response indicating a successful authentication of the authentication credentials may be communicated from the access control system 102 to an associated interface and/or a remote authentication service 114.

In some embodiments, certain aspects of a credential authentication process may involve a remote authentication service 114 communicatively coupled to the access control system 102 (e.g., via a network communication module 126 and/or network 116). For example, in some embodiments, the access control system 102 may communicate authentication credentials provided by a user 104 (e.g., via an interface or the like) to the remote authentication service 114. A remote service credential authentication module 130 may make an authentication decision based on the authentication credentials and/or other authentication information 132 managed by the authentication service 114 (e.g., known PINs associated with personnel having access rights). For example, the authentication service 114 may compare a PIN included in the authentication credentials provided by the user 104 with known PINs associated with personnel having current access rights to the distributed site 118. Based on the results of the determination, the authentication service 114 may communicate a response to the physical access control system 102 indicating whether the authentication credentials were authenticated by the service 114.

In certain embodiments, the access control system 102 may implement multi-factor authentication processes (e.g., a two-factor authentication process) in connection with managing physical access to the distributed site 118. Accordingly, in some embodiments, the access control system 102 may include a secondary authentication module (not shown) facilitating a second factor authentication process for managing access to the distributed site 118. In certain embodiments, authentication processes, including primary and secondary authentication processes, consistent with embodiments disclosed herein may include, without limitation, knowledge factor authentication (e.g., demonstrating knowledge of a password, a passphrase, a PIN, a challenge response, a pattern, etc.), ownership or possession factor authentication (e.g., demonstrating possession of a security and/or an identification card, a security token, a hardware token, a software token, a security key, etc.), and/or inherence and/or biometric factor authentication (e.g., providing fingerprint, retinal, signature, voice, facial recognition, and/or other biometric identifiers), and/or the like.

Upon authenticating and allowing a user 104 physical access to the distributed site 118, the access control system 102 may identify one or more transient assets 110 located within the distributed site 118. As used herein, a transient asset 110 may comprise any asset, object, device, and/or the like that may be associated with a user 104. In certain embodiments, a transient asset 110 may comprise an electronic device including, without limitation, a smartphone (e.g., the Apple® iPhone™, the Motorola® Droid®, and the BlackBerry® Storm™), a tablet computer (e.g., the Apple® iPad™, the HP® Slate, and the Samsung® Galaxy™ Tablet), a laptop computer, a cellular telephone, a wireless communication device (e.g., a radio transceiver, a pager, etc.), a storage device (e.g., a USB storage device and/or flash drive), test equipment, and/or any other electronic device that may be associated with and/or otherwise owned or possessed by a user 104.

In further embodiments, a transient asset 110 may comprise any physical object that may be electronically tagged and/or otherwise associated with a device allowing the physical asset 110 to be uniquely identified by the access control system 102 and/or another associated system. For example, in certain embodiments, the transient asset 110 may comprise any object affixed to a secure tag that may comprise information that uniquely identifies the transient asset 110. In certain embodiments, the secure tag may comprise a Near Field Communication ("NFC") tag, a radio-frequency identification ("RFID") tag, a universal serial bus ("USB") token, a Bluetooth®-low energy ("BLE") device storing secure information, and/or the like.

In certain embodiments, a transient asset 110 may be identified through an asset polling and/or discovery process executed by the access control system 102 and/or another associated system. In certain embodiments, this asset discovery process may initialize and/or otherwise trigger when physical access to the distributed site 118 by the user 104 is authenticated by the access control system 102. The polling and/or discovery process may continue continuously and/or periodically following triggering by an authentication event. In further embodiments, the polling and/or discovery process may be performed periodically independent of the occurrence of any authentication events.

In some embodiments, a transient asset 110 may be identified and/or a discovery process may be initiated when the transient asset 110 is communicatively connected to the access control system 102 and/or any equipment associated with the distributed site 118. For example, a discovery process may be initialized when a transient asset 110 comprising a USB storage device is communicatively connected to equipment (e.g., via a USB port) included in the distributed site. Similarly, a discovery process may be initialized when a transient asset comprising a smartphone is connected to a wireless communication system associated with the distributed site 118.

In connection with the discovery process, identification information 112 may be communicated from the transient asset 110 to the access control system 102. Identification information 112 may be communicated from the transient asset 110 either directly and/or via one or more intermediate systems. In some embodiments, the access control system 102 may comprise a wireless communication module 120 comprising software and/or hardware configured to facilitate wireless communication between the access control system 102 and the transient asset 110. For example, in some embodiments, the access control system 102 may be configured to communicate with the transient asset 110 via a Bluetooth® wireless communication channel, a RFID communication channel, and/or the like. In further embodiments, the access control system 102 may alternatively and/or in addition communicate with the transient asset 110 via one or more wired communication protocols (e.g., via one or more communication ports or the like).

The identification information 112 may comprise any information that may uniquely identify the associated transient asset 110. For example, in some embodiments, the identification information 112 may comprise a media access control ("MAC") address. In other embodiments, the identification information 112 may comprise an universally unique identifier ("UUID") (e.g., a 128 bit value or the like), a globally unique identifier ("GUID"), a serial number, an unique identification marking, an UID marking, an item unique identification ("IUID"), an unique item identifier ("UII"), an electronic product code ("EPC"), an unique identifier ("UID") (e.g., as may be used in connection with NFC devices), a vendor identifier ("VID"), a product identifier ("PID"), a license number, and/or any other type of information that may identify the associated transient asset 110.

Using the received identification information 112 and information identifying a user 104 that has been granted access to the distributed site 118 (e.g., as determined by authentication information provided by the user 104), the access control system 102 may engage in a transient asset ownership identification process using an associated module 124 executed thereon. As part of such a process, the access control system 102 may perform a correlation process to associate particular users 104 with transient assets 110. For example, if the access control system 102 determines that a user 104 has been granted physical access to the distributed site 118 and identifies that a particular transient asset 110 has been brought within the access-controlled boundary of the distributed site 118 contemporaneously, the access control system 102 may associate the user 104 with the transient asset 110. As discussed in more detail below, in some embodiments this process may utilize historical asset ownership information, including probability information relating to an association between a user 104 and a transient asset 110, to improve identification associations between users 104 and transient assets 110.

In some embodiments, an identified association between a user 104 and a transient asset 110 may comprise an ownership association between the user 104 and the transient asset 110. A variety of other associations between a user 104 and/or a transient asset 110 may also be identified including, for example, a group ownership association, a temporary ownership association, and/or a take-and-leave association. In a group ownership association, a transient asset 110 may be associated with a plurality of users (e.g., a team of technicians collectively and/or the like). In a temporary ownership association, a user 104 and/or group of users may be associated with a transient asset 110 on a temporary basis (e.g., by checking out the transient asset 110 or the like). In a take-and-leave association, a user 104 may be expected to bring the transient asset 110 to the distributed site 118 and leave the asset 110 at the site 118.

In some embodiments, information relating to identified associations between a user 104 and a transient asset 110 may be provided to a remote authentication service 114 and/or another system. For example, transient asset ownership information 134 may be maintained by the remote authentication service 114 and be used in connection with managing relationships between a plurality of transient assets 110 and/or a plurality of users 104.

In some embodiments, relationships between transient assets 110 and/or users 104 may be policy-managed. In certain embodiments, the asset ownership information 134 and/or information provided by the access control system 104 may be utilized to enforce policies relating to one or more users 104 and/or transient assets 110. For example, an articulated policy of a utility provider may require that authorized users 104 only bring approved transient assets 110 into an access-controlled area of a distributed site 118. Upon detecting an unapproved transient asset 110 associated with a user 104 within the access-controlled area using embodiments of the disclosed systems and methods, the utility provider may notify the user 104 of the policy violation and request/require that actions be taken to ensure future compliance.

It will be appreciated that a number of variations can be made to the architecture and relationships presented in connection with FIG. 1 within the scope of the inventive body of work. For example, without limitation, in some embodiments, some or all of the functions performed by the access control system 102 may be performed by the remote authentication service 114 and/or one or more other associated systems. Similarly, some or all of the functions performed by the remote authentication service 114 may be performed by the access control system 102 and/or one or more other associated systems. In further embodiments, physical access control and transient asset management consistent with the disclosed embodiments may be implemented using any combination of suitable systems. Thus it will be appreciated that the architecture and relationships illustrated in FIG. 1 are provided for purposes of illustration and explanation, and not limitation.

Figure 2:
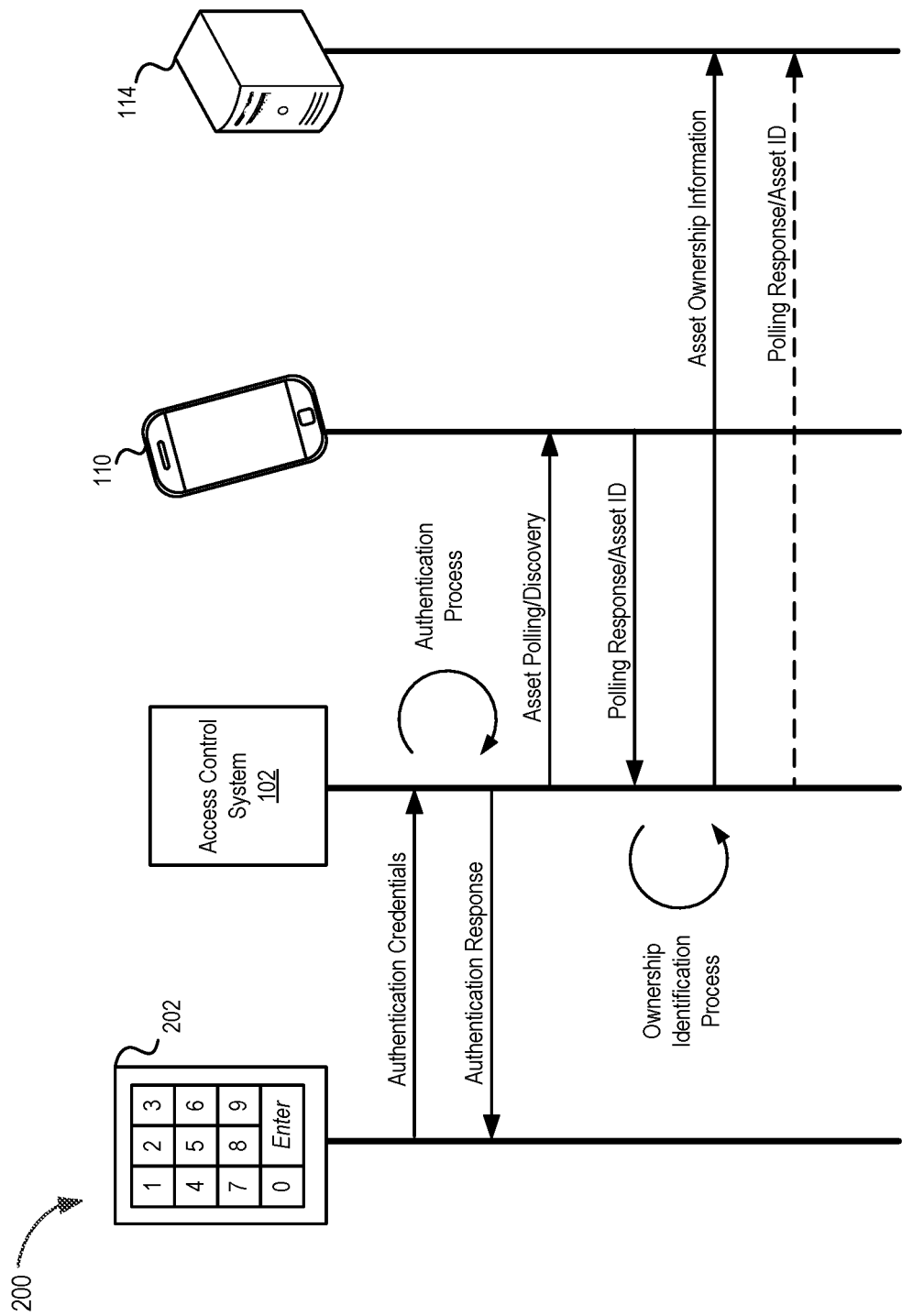
FIG. 2 illustrates a diagram showing a transient asset management process consistent with embodiments disclosed herein.

FIG. 2 illustrates a diagram 200 showing a transient asset management process consistent with embodiments disclosed herein. The transient asset management process may be used to manage and/or otherwise associate one or more users with a transient asset 110 brought within a physical-access-controlled area of a distributed site of an electric power generation and/or delivery system. As discussed above, a physical access control interface 202, an access control system 102 associated with the distributed site, and/or a remote authentication service 114 may be utilized in connection with management of the transient asset 110 consistent with embodiments of the disclosed systems and methods.

As illustrated, as part of a physical access authentication process for an access-controlled area of a distributed site, a user may enter authentication credentials (e.g., a PIN, password, and/or the like) via an access control interface 202. The authentication credentials may be communicated to an access control system 102 managing, among other things, physical access to the access-controlled area of the site. Upon receipt of the authentication credentials, the access control system 102 may perform an authentication process based on the authentication credentials and/or the authentication request. For example, the access control system 102 may compare a PIN included in the authentication credentials with known PINs associated with personnel having current access rights to the distributed site. Based on the results of the determination, the access control system 102 may communicate an authentication response indicating whether the authentication credentials provided by the user were authenticated and provide or deny associated physical access. In some embodiments, certain processes illustrated in connection with FIG. 2 as being performed by the access control system may be performed by a remote authentication service 114.

Upon authenticating physical access to the controlled area to the user, the access control system 102 and/or another associated system may engage in an asset polling and/or discovery process. In response to the polling and/or discovery process, identification information that uniquely identifies the transient asset 110 may be transmitted to the access control system 102.

Using the received identification information and information identifying a user that has been granted physical access to the controlled area through the authentication process, the access control system 102 may engage in a transient asset ownership identification process. As part of such a process, the access control system 102 may perform a correlation process to associate particular users with transient assets 110. In further embodiments, identification information received from the transient asset 110 may be transmitted by the access control system 102 to the remote authentication service 114 and/or another service, which may engage in the transient asset ownership identification process.

Figure 3:
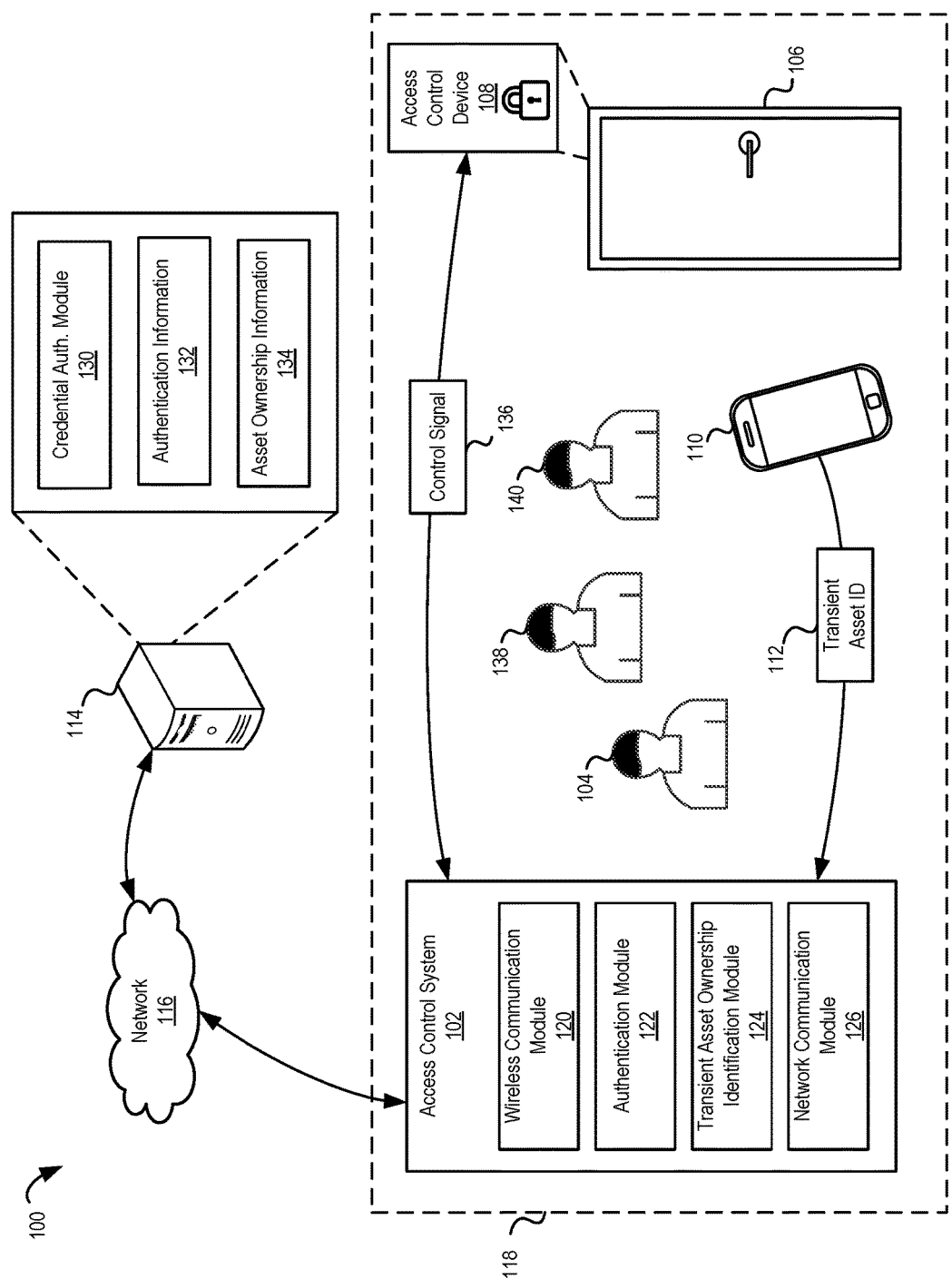
FIG. 3 illustrates an example of associating a transient asset with a plurality of users consistent with embodiments disclosed herein.

FIG. 3 illustrates an example of associating a transient asset 110 with a plurality of users 104, 138, 140 consistent with embodiments disclosed herein. Prior to entering an access-controlled area of the distributed site 118, each user of the plurality of users 104, 138, 140 may authenticate their rights to physically access the access-controlled area. Upon authenticating the rights to access the access-controlled area, the access control system 102 and/or one or more other associated systems may engage in a polling and/or discovery process to identify one or more transient assets 110 within the access-controlled area of the distributed site 118.

In response to the polling and/or discovery process, identification information 112 may be received by the access control system 102 from a transient asset 110. Using the received identification information 112 and information identifying users 104, 138, 140 that has been granted access to the distributed site 118 (e.g., as determined by authentication information provided by the user 104), the access control system 102 may engage in a transient asset ownership identification process using an associated module 124 executed therein. As part of such a process, the access control system 102 may perform a correlation process to associate particular users 104, 138, 140 with transient assets 110.

As an example, if the access control system 102 determines that three users 104, 138, 140 have been granted physical access to the distributed site 118 and identifies that a particular transient asset 110 has been brought within the access-controlled boundary of the distributed site 118 contemporaneously, the access control system 102 may associate at least one of the users 104, 138, 140 with the transient asset 110. For example, the access control system 102 may determine that there is a 33.33% probability that the transient asset 110 is associated with and/or otherwise owned by each of users 104, 138, 140. Similarly, if the access control system 102 were to determine that four users were granted physical access to the distributed site 118, the access control system may determine that there is a 25% probability that the transient asset 110 is associated with and/or otherwise owned by any one of the four users. In certain embodiments, such associative probability information may be stored by the transient asset ownership identification module 124 and/or by the remote service provider 114 (e.g., as part of asset ownership information 134) for use in connection with future ownership identification processes.

In some embodiments, historical asset ownership information including, without limitation, probability information relating to prior identified association between users 104, 138, 140 and transient assets 110, may be utilized to improve future associations between users 104, 138, 140 and transient assets 110 in connection with ownership identification processes. For example, in the above example involving three users 104, 138, 140, if user 104 returns to the distributed site 118 and the transient asset 110 is detected, the probability of the association between user 104 and the transient asset 110 may be increased, and the probability of the association between users 138, 140 and the transient asset 110 may be decreased. With repeated ownership identification processes, identified associations between users 104, 138, 140 and transient devices 110 may become more significant (i.e., probabilities of an association between a particular user of a group of users may increase), allowing for more certain association and/or ownership determinations to be made.

Embodiments of the disclosed systems and methods may be utilized in connection with a variety of applications including, without limitation, centralized transient asset management and/or inventory tracking, unattended transient asset detection, and/or unrecognized transient asset detection, enrollment, and/or policy-management. In certain embodiments, transient asset association and/or ownership information may be stored by an access control system 102, a remote service provider 114 (e.g., a centralized service provider system), and/or any other system or combination of systems and be used in connection with transient asset management and/or inventory activities. For example, transient asset association and/or ownership information obtained from a plurality of distributed sites may be utilized in connection with identifying where transient assets are located and/or where they have been previously located. Similarly, transient asset association and/or ownership information may allow for a variety of asset provenance tracking determinations (e.g., whether a particular device has been moved from a first distributed site to a second distributed site by a particular user and at a particular time or the like).

In further embodiments, systems and methods disclosed herein may be utilized to identify unattended transient assets. For example, by detecting both physical-access authentication events and exit events (e.g., badge-out events or the like) from an access-controlled area of a distributed site in connection with identifying transient assets brought within the distributed site, the systems and methods disclosed herein may be used to identify instances when a transient asset is left unattended in the access-controlled area (e.g., as may be the case when a transient asset is identified in the access-controlled area without any users). In such an instance, a notification may be sent to a user associated with a transient asset (e.g., a user who left the transient asset unattended) and/or another interested party (e.g., operations and/or dispatch organizations associated with the distributed site and/or a supervisor of the user).

In certain embodiments, notifications may escalate based on various circumstances. For example, if an unknown or unrecognized transient asset is identified within the access-controlled boundary, a more escalated notification may be issued (e.g., notification to both a recent user having physical access to a distributed site and/or their supervisor and/or the like) as such an asset may pose a security risk. In addition, identification of unattended transient assets may be used by an access control system 102 of a distributed site 118 in connection with implementing a variety of protective actions to mitigate potential harm that may be caused by the presence of unattended and/or otherwise unknown transient assets (e.g., terminating certain processes, shutting off certain electronic resources and/or access points, and/or the like). In certain embodiments, such notifications and/or other responses issued in connection with transient asset ownership determinations may be based on a variety of articulated policies associated with particular transient assets, users, and/or distributed sites.

Systems and methods disclosed herein may be further utilized in connection with identifying unrecognized transient assets and/or enrolling previously unrecognized assets in one or more domains. As an example, an organization may apply RFID tags to new equipment issued to technicians, but may not wish to incur the administrative burden of manually associating the equipment with particular technicians in a database. Using embodiments of the disclosed systems and methods, the organization may issue tagged equipment to technicians and determine associations between technicians and equipment over time.

Figure 4:
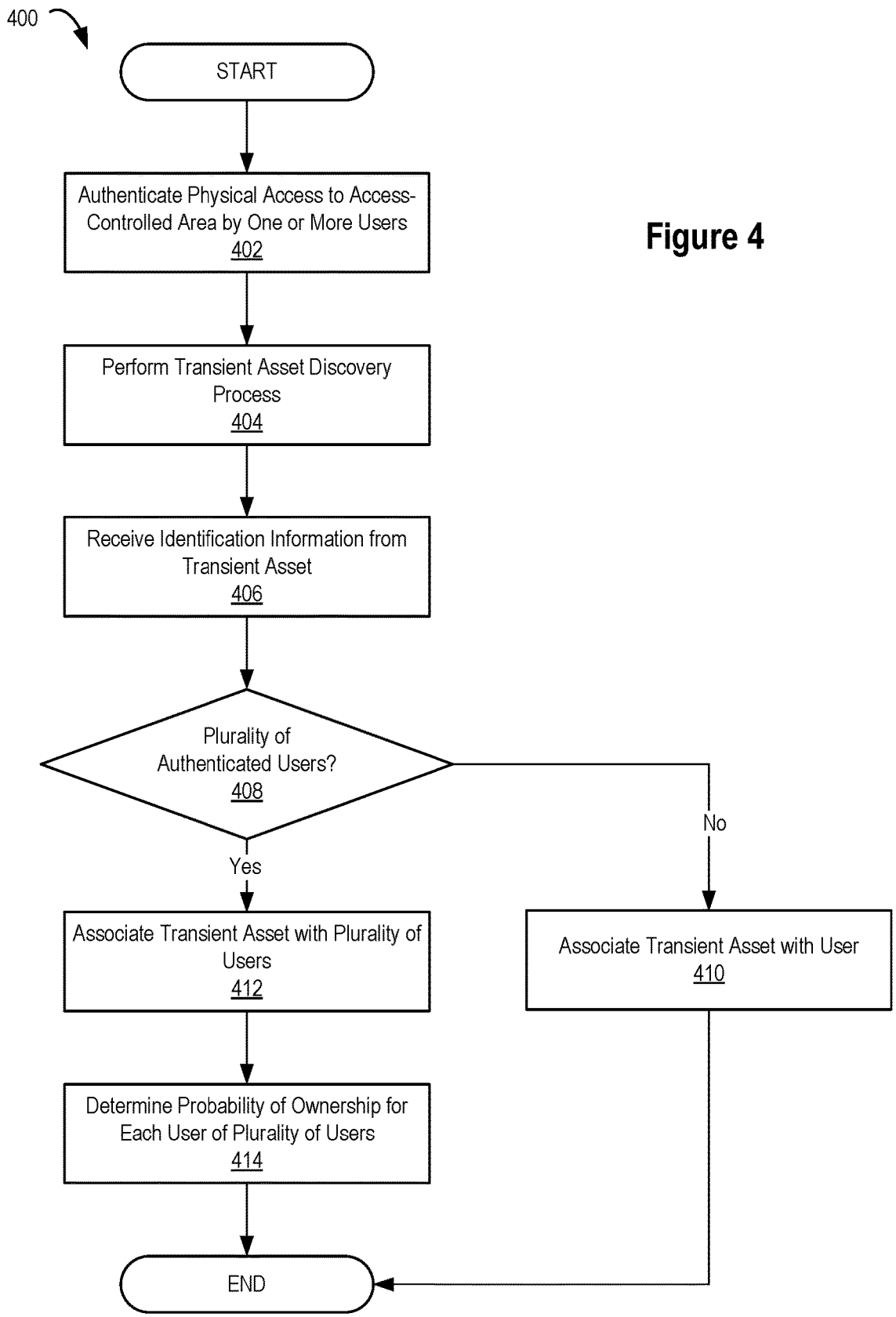
FIG. 4 illustrates a method of managing a transient asset consistent with embodiments disclosed herein.

FIG. 4 illustrates a method 400 of managing a transient asset consistent with embodiments disclosed herein. In certain embodiments, elements of the method 400 may be performed by an access control system associated with a distributed site of an electric power generation and/or delivery system. In further embodiments, elements of the method 400 may be performed by a remote authentication system and/or any other suitable system and/or combination of systems.

At 402, one or more users may authenticate their right to physically access an access-controlled area of a site. In certain embodiments, this authentication process may involve a user providing authentication credentials (e.g., a PIN, password, and/or the like) to an access control system that may determine whether the authentication credentials are associated with an individual having current physical access rights to an associated distributed site.

Once physical access to the access-controlled area has been authenticated at 402 and/or after a certain period has elapsed following an authentication event, a polling and/or discovery process may be initiated at 404 to identify one or more transient assets within the access-controlled area. In response to this process, identification information that uniquely identifies a transient asset may be received at 406 (e.g., received by the access control system and/or another system implementing embodiments of the disclosed systems and methods). For example, in some embodiments, a MAC address uniquely identifying a transient asset may be received at 406, although other types of identification information may also be utilized in connection with the disclosed embodiments.

At 408, a determination may be made as to whether a plurality of users are physically located within the access-controlled area. That is, a determination may be made as to whether a plurality of users have authenticated their right to physically access the access-controlled area and have entered the access-controlled area within a particular time period. If a plurality of users have not authenticated physical access to the access-controlled area (i.e., only a single user has authenticated their access to and are located within the access-controlled area), the method 400 may proceed to 410. At 410, the transient asset associated with the identification information received at 406 may be correlated and/or otherwise associated with the single user. For example, the transient asset may be indicated as being owned by the user.

In certain embodiments, it may be determined that the transient asset has been previously associated with one or more users. If so, the method 400 may further comprise updating previously-stored association information based on the association performed at 410. For example, a probability of an association between the transient asset and the user may be increased. Similarly, a probability of an association between the transient asset and another user previously associated with the transient asset may be decreased. In this manner, with repeated ownership identification processes, identified associations between users and transient devices may become more significant (i.e., probabilities of an association between a particular user and/or a group of users may increase), allowing for more certain association and/or ownership determinations to be made.

If a plurality of users have authenticated physical access to the access-controlled area (i.e., a plurality of users authenticated their access to and are located within the access-controlled area), the method 400 may proceed from 408 to 412. At 412, the transient asset associated with the identification information received at 406 may be correlated and/or otherwise associated with the plurality of users. In some embodiments, such joint association and/or ownership may be indicated in one or more probabilities of association between each of the plurality of users and the transient asset. For example, if it is determined that four users were granted physical access to the access-controlled area, it may be determined at 414 that there is a 25% probability that the transient asset is associated with and/or otherwise owned by any one of the four users.

In certain embodiments, such associative probability information may be stored for use in connection with future ownership identification processes. For example, as described above, historical asset ownership information including, without limitation, probability information relating to prior identified associations between users and a transient asset may be utilized to improve future associations. In certain embodiments, the associative probabilities determined at 414 may be used in connection with updating previously-stored probabilities of association between a transient asset and one or more users. The method 400 may then proceed to terminate.

Figure 5:
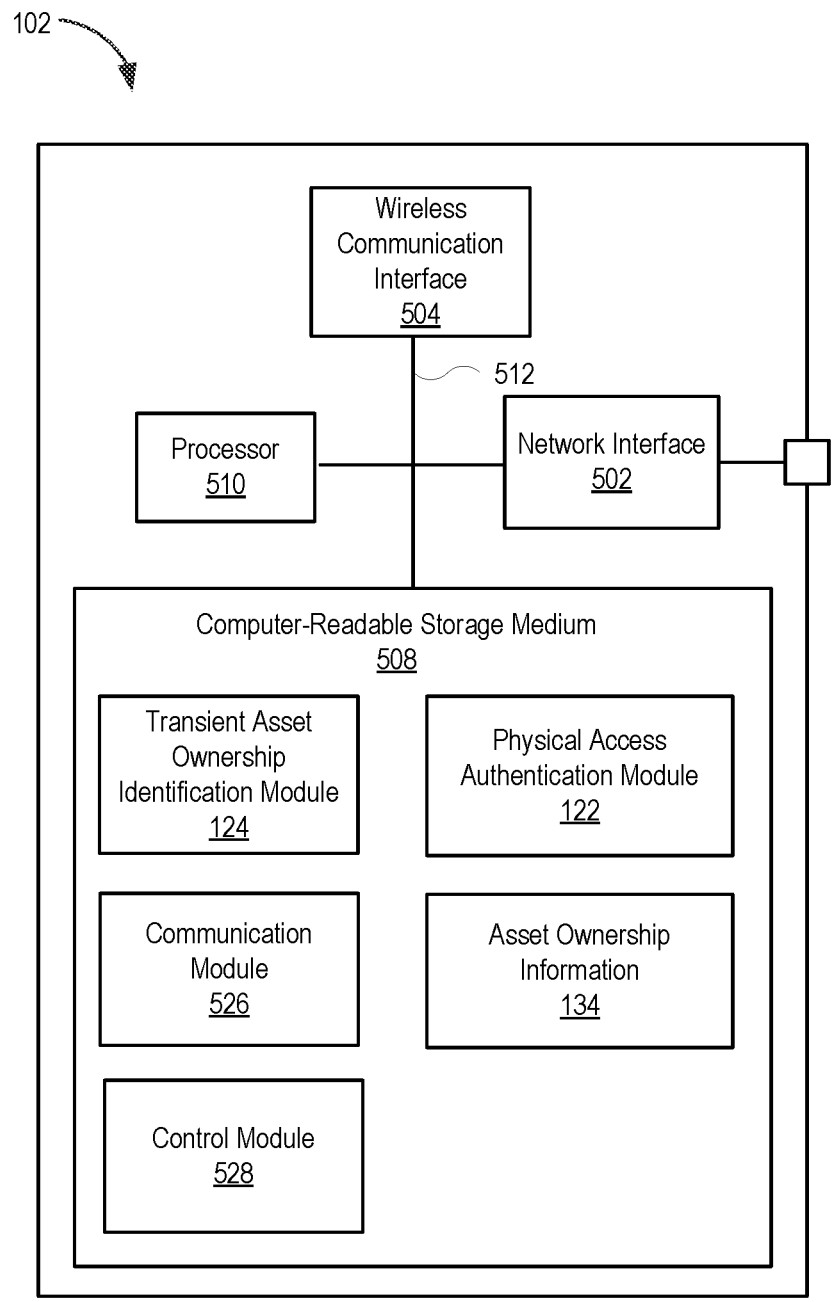
FIG. 5 illustrates a functional block diagram of a transient asset management system consistent with embodiments disclosed herein.

FIG. 5 illustrates a functional block diagram of access control system 102 consistent with embodiments disclosed herein. In some embodiments, the access control system 102 may comprise an IED. Embodiments of the access control system 102 may be utilized to implement embodiments of the systems and methods disclosed herein. For example, the access control system 102 may be configured to manage one or more transient assets and/or identify associations between transient assets and/or users within an access-controlled area of a distributed site of an electric power generation and delivery system.

The access control system 102 may include a network interface 502 configured to communicate with a communication network. The physical access control system 102 may further include a wireless communication interface 504 configured to facilitate communication with a network, other systems and/or devices, and/or mobile devices. For example, in some embodiments, the access control system 102 may be configured to securely communicate with a proximately located transient assets using wireless communication interface 504 (e.g., receive transient asset identification information for use in connection with embodiments of the disclosed systems and methods and/or the like).

A computer-readable storage medium 508 may be the repository of one or more modules and/or executable instructions configured to implement any of the processes described herein. A data bus 512 may link the network interface 502, the wireless communication interface 504, and the computer-readable storage medium 508 to a processor 510. The processor 510 may be configured to process communications received via network interface 502 and/or wireless communication interface 504. The processor 510 may operate using any number of processing rates and architectures. The processor 510 may be configured to perform various algorithms and calculations described herein using computer executable instructions stored on computer-readable storage medium 508.

The computer-readable storage medium 508 may be the repository of one or more modules and/or executable instructions configured to implement certain functions and/or methods described herein. For example, the computer-readable storage medium 508 may include one or more transient asset ownership identification modules 124, which may be a repository of the modules and/or executable instructions configured to implement the transient asset association methods described herein. The computer-readable medium 508 may further include a communication module 526, asset ownership information 134 which may comprise a repository for storing information regarding transient assets and associated users, a control module 528, and/or a physical access authentication module 122.

The physical access authentication module 122 may perform physical access authentication processes consistent with embodiments disclosed herein. For example, as discussed above, in certain embodiments, the physical access authentication module 122 may implement a knowledge factor-based authentication process (e.g., a PIN authentication process) in connection with authenticating physical access to an access-controlled area of a distributed site. In certain embodiments, the physical access authentication module 122 may utilize authentication information (e.g., known authentication credentials associated with individuals having current access rights) managed by the access control system 102 and/or an associated remote system in connection with authentication determination processes.

A control module 528 may be configured to interface with access control devices associated with the access control system 102. According to some embodiments, control instructions issued by the control module 528 may be configured to allow and/or deny access to a distributed site and/or equipment associated with the same. In further embodiments, the control module 528 may be configured to issue notifications and/or control signals in response to a determination that an asset has been left unattended within an access-controlled area. In some cases, control instructions may be only informative or suggestive, meaning that the receiving device is not obligated to perform the control instruction. Rather, the receiving device may use the suggested control instruction in coordination with its own determinations and information from other controllers to determine whether it will perform the control instruction. In other cases control instructions may be directive in that they are required actions. Differentiation between informative or suggestive control instructions and mandatory control instructions may be based on information included with the control instructions.

A communication module 526 may include instructions for facilitating communication of information from the access control system 102 to other controllers, systems, devices, transient assets and/or other components in the electric power delivery system and/or a distributed site associated with the same. The communication module 526 may include instructions on the formatting of communications according to a predetermined protocol. Communication module 526 may be configured with subscribers to certain information, and may format message headers according to such subscription information.

While specific embodiments and applications of the disclosure have been illustrated and described, it is to be understood that the disclosure is not limited to the precise configurations and components disclosed herein. For example, the systems and methods described herein may be applied to a variety of distributed sites of an electric power generation and delivery system. It will further be appreciated that embodiments of the disclosed systems and methods may be utilized in connection with a variety of systems, devices, and/or applications utilizing physical access control systems and methods, and/or applications that are not associated with and/or are otherwise included in an electric power delivery system. Accordingly, many changes may be made to the details of the above-described embodiments without departing from the underlying principles of this disclosure. The scope of the present invention should, therefore, be determined only by the following claims.

What is claimed is:

1. An access control system associated with an access-controlled area of a distributed site of an electric power delivery system, the system comprising:
    a credential input interface configured to receive authentication credentials from one or more users;
    a communications interface configured to receive identification information from one or more proximately-located transient assets;
    a processor communicatively coupled to the credential input interface and the communications interface;
    a computer-readable storage medium communicatively coupled to the processor, the computer-readable storage medium storing instructions that when executed by the processor cause the processor to:
        determine whether the authentication credentials received by the credential input interface are associated with one or more users having physical access rights to the access-controlled area;
        generate, based on the determination, a control signal configured to implement an access control action by an access control device associated with the access-controlled area allowing physical access to the one or more users; and
        receive, in response to a first transient asset discovery process performed by the processor, identification information from the one or more proximately-located transient assets;
        determining a probability of association between the one or more transient assets and the one or more users;
        generate transient asset association information associating the one or more transient assets with the one or more users based on the identification information, the authentication credentials, and the probability of association;
        storing the transient asset association information on the computer-readable storage medium.

2. The system of claim 1, wherein
    the instructions further cause the processor to determine historical associative information comprising prior identified association between the one or more transient assets and the one or more users; and,
    the transient asset association information is further based on the historical associative information.

3. The system of claim 1, wherein the credential input interface is further configured to receive an indication that the one or more users have exited the access-controlled area and the computer-readable storage medium further stores instructions that when executed by the process cause the processor to:
    initiate a second transient asset discovery process based on receiving the indication; and
    receive, in response to the second transient asset discovery process, the identification information from the one or more proximately located transient assets; and
    determine that the one or more transient assets are unattended.

4. The system of claim 3, wherein the computer-readable storage medium further stores instructions that when executed by the process cause the processor to:
    generate a notification that the one or more transient assets are unattended;
    transmit the notification to one or more mobile devices associated with the one or more users.

5. The system of claim 3, wherein the computer-readable storage medium further stores instructions that when executed by the processor cause the processor to:
    generate a notification that the one or more transient assets are unattended; and
    transmit the notification to a system associated with a supervisor of the one or more users.

6. A method for managing transient assets brought within an access-controlled area of a distributed site of an electric power delivery system, the system comprising:
    receiving, at a credential input interface, authentication credentials from one or more users;

determining that the received authentication credentials are associated with one or more users having physical access rights to the access-controlled area;

generating, based on the determination, a control signal configured to allow the one or more users physical access to the access-controlled area;

performing a first transient asset discovery process to identify one or more proximately-located transient assets;

receiving, in response to the first transient asset discovery process, identification information from the one or more proximately located transient assets;

determining a probability of association between the one or more transient assets and the one or more users;

generating transient asset association information associating the one or more transient assets with the one or more users based on the identification information, the authentication credentials, and the probability of association; and storing the transient asset association information on a non-transitory computer-readable storage medium.

* * * * *